(12) United States Patent
Hung

(10) Patent No.: US 11,085,514 B2
(45) Date of Patent: Aug. 10, 2021

(54) ROTARY DEVICE

(71) Applicant: PEGATRON CORPORATION, Taipei (TW)

(72) Inventor: Shih-Wei Hung, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 87 days.

(21) Appl. No.: 16/373,769

(22) Filed: Apr. 3, 2019

(65) Prior Publication Data
US 2019/0368586 A1 Dec. 5, 2019

(30) Foreign Application Priority Data

Jun. 1, 2018 (TW) .................................. 107119081

(51) Int. Cl.
*F16H 35/00* (2006.01)
(52) U.S. Cl.
CPC ....... *F16H 35/00* (2013.01); *F16H 2035/006* (2013.01)
(58) Field of Classification Search
CPC ............................ F16H 2035/006; F16H 35/00
See application file for complete search history.

(56) References Cited

U.S. PATENT DOCUMENTS 8,424,406 B2 * 4/2013 Wintsch ................ F16K 31/535
74/421 A
2015/0000465 A1 1/2015 Baba et al.

FOREIGN PATENT DOCUMENTS

| CN | 101211187 A | 7/2008 | |
|---|---|---|---|
| CN | 206180770 U | 5/2017 | |
| EP | 2479009 A1 * | 7/2012 | ............. B25J 9/101 |
| JP | H07190162 A | 7/1995 | |
| JP | 2692958 B2 | 12/1997 | |
| JP | 10156786 A * | 6/1998 | |
| JP | 2006202072 A | 8/2006 | |
| TW | I236869 B | 7/2005 | |
| TW | I268983 B | 12/2006 | |

OTHER PUBLICATIONS

Office Action issued in corresponding Taiwan patent application dated May 17, 2019.

* cited by examiner

*Primary Examiner* — Bobby Rushing, Jr.
(74) *Attorney, Agent, or Firm* — McClure, Qualey & Rodack, LLP

(57) ABSTRACT

A rotary device includes a rotatable member, at least one movable ring, and a supporting member. The supporting member includes a stopping portion. The rotatable member includes a rotary ring and a positioning portion. The movable ring includes an acting portion. The rotary ring and the at least one movable ring are coaxially disposed on the supporting member, and the movable ring is disposed between the rotatable member and the supporting member. The rotary ring and the at least one movable ring is capable of rotating relative to the supporting member. A part of the positioning portion overlaps the movable ring. When the rotary ring rotates relative to the supporting member, the part of the positioning portion pushes the acting portion, to drive the at least one movable ring to rotate until the acting portion is stopped between the positioning portion and the stopping portion.

12 Claims, 8 Drawing Sheets ial application claims priority under 35
ROTARY DEVICE

CROSS-REFERENCE TO RELATED APPLICATION

This non-provisional application claims priority under 35 U.S.C. § 119(a) to Patent Application No. 107119081 filed in Taiwan, R.O.C. on Jun. 1, 2018, the entire contents of which are hereby incorporated by reference.

BACKGROUND

Technical Field

The application generally relates to a rotary device. Specifically, the application relates to a rotary device that increases a rotation limiting angle by using a movable ring.

Related Art

As use habits are diversified, current instruments or devices usually need reliable large-angle rotation control. However, two-way limitation of an existing rotary device is limited by a structural design, and is usually limited within 180 degrees. When the rotary device intends to achieve angle control when a two-way limitation angle is greater than 180 degrees, because forward and reverse rotation has an overlapping location, the rotary device needs a more complex stopping mechanism, and mechanism interference is usually caused. Consequently, it is difficult to implement the angle control.

SUMMARY

An objective of the application is to provide a rotary device, which can achieve a function that two-way limitation is greater than 180 degrees.

An objective of the application is to provide a rotary device, which can increase both a two-way limiting angle and the number of two-way rotations by increasing the number of movable rings.

In an embodiment, the rotary device of the application includes a rotatable member, at least one movable ring, and a supporting member. The supporting member includes a stopping portion. The rotatable member includes a rotary ring and a positioning portion. The positioning portion axially protrudes from the rotary ring. Each of the at least one movable ring includes an acting portion. The rotary ring and the at last one movable ring are coaxially disposed on the supporting member, and the at least one movable ring is disposed between the rotatable member and the supporting member. The rotary ring and the at least one movable ring is capable of rotating relative to the supporting member. A part of the positioning portion overlaps the movable ring. When the rotary ring rotates relative to the supporting member, the part of the positioning portion pushes the acting portion, to drive the at least one movable ring to rotate until the acting portion is stopped between the positioning portion and the stopping portion.

In an embodiment, the movable ring includes a ring body, the acting portion includes an upper portion and a lower portion, the upper portion is disposed on a periphery of the ring body, the lower portion axially protrudes from the ring body from one end of the upper portion, the part of the positioning portion corresponds to the upper portion, so that the part of the positioning portion is capable of pushing the upper portion, and the stopping portion corresponds to the lower portion, so that the stopping portion is capable of stopping the lower portion.

In an embodiment, the supporting member includes a supporting shaft, the stopping portion is fixed on the supporting shaft, and the positioning portion axially protrudes from a periphery of the rotary ring and partially overlaps the movable ring.

In an embodiment, the supporting member includes a base, the stopping portion is fixed on the base, the rotatable member further includes a shaft body portion, the positioning portion axially protrudes from a periphery of the rotary ring and partially overlaps the movable ring, and the rotary ring is fixedly sleeved over the shaft body portion, so that the rotatable member is rotatably disposed on the base.

In an embodiment, the at least one movable ring is a plurality of the movable rings, the movable ring includes a ring body, the acting portion includes an upper portion and a lower portion, the upper portion is protruded from a periphery of the ring body, the lower portion axially protrudes from the ring body from one end of the upper portion, the movable rings are movably coaxially disposed between the rotatable member and the supporting member, and the upper portion of the movable ring that is close to the positioning portion corresponds to the positioning portion, so that the positioning portion is capable of pushing the upper portion, and the lower portion of the movable ring that is close to the stopping portion corresponds to the stopping portion, so that the stopping portion is capable of stopping the lower portion.

In an embodiment, when the rotary ring rotates relative to the supporting member, the positioning portion pushes the upper portion of the movable ring that is close to the positioning portion, and drives the lower portion of the movable ring that is close to the positioning portion to push the adjacent upper portion of the movable ring, the acting portions sequentially drive the adjacent movable rings to rotate until the stopping portion stops the lower portion of the movable ring that is close to the stopping portion, and the acting portions are stopped between the positioning portion and the stopping portion.

In an embodiment, the positioning portion, the acting portions, and the stopping portion are arranged in a staggered manner from left to right along a virtual line parallel to an axial direction.

In an embodiment, a location of the stopping portion is defined as a first side, a location of the acting portion of the movable ring that is close to the stopping portion is defined as a second side, and the positioning portion, the acting portions, and the stopping portion are arranged in a staggered manner respectively along an extension direction of the first side and an extension direction of the second side.

In an embodiment, when the number of the movable rings is an odd number, the positioning portion of the rotatable member is arranged along the virtual line on the same side as the stopping portion, and when the number of the movable rings is an even number, the positioning portion of the rotatable member is disposed 180-degree away from the stopping portion.

In an embodiment, the movable ring includes a ring body, the acting portion includes a first acting portion, the movable ring further includes a second acting portion, and the second acting portion and the first acting portion are disposed on a periphery of the ring body; when the rotary ring rotates along a first rotation direction relative to the supporting member, the part of the positioning portion pushes the second acting portion, to drive the at least one movable ring to rotate until the second acting portion and the first acting portion are stopped between the positioning portion and the stopping portion; and when the rotary ring rotates along a second rotation direction opposite to the first rotation direction relative to the supporting member, the part of the positioning portion pushes the first acting portion, to drive the at least one movable ring to rotate until the first acting portion and the second acting portion are stopped between the positioning portion and the stopping portion.

In an embodiment, the stopping portion includes a first stopping portion, the supporting member further includes a second stopping portion, and the second stopping portion and the first stopping portion are disposed on a periphery of the supporting member; when the rotary ring rotates along a first rotation direction relative to the supporting member, the part of the positioning portion pushes the acting portion, to drive the at least one movable ring to rotate until the acting portion is stopped between the positioning portion and the first stopping portion; and when the rotary ring rotates along a second rotation direction opposite to the first rotation direction relative to the supporting member, the part of the positioning portion pushes the acting portion, to drive the at least one movable ring to rotate until the acting portion is stopped between the positioning portion and the second stopping portion.

Compared with existing technologies, the rotary device of the application can provide a function of two-way positioning of greater than 180 degrees. Further, the rotary device of the application can increase both a two-way limiting angle and the number of two-way rotations by increasing the number of movable rings.

DETAILED DESCRIPTION OF THE EMBODIMENTS

The application provides a rotary device, and in particular, a rotary device that achieves large-angle limitation and increases a two-way limiting angle and the number of two-way rotations by using a movable ring. Specifically, the rotary device of the application may be applied to any device that needs large-angle limitation and that needs to increase a two-way limiting angle and the number of two-way rotations, for example, a display device. However, the application is not limited thereto. Hereinafter, details of the rotary device of embodiments of the application are described with reference to the drawings.

Figure 1A:
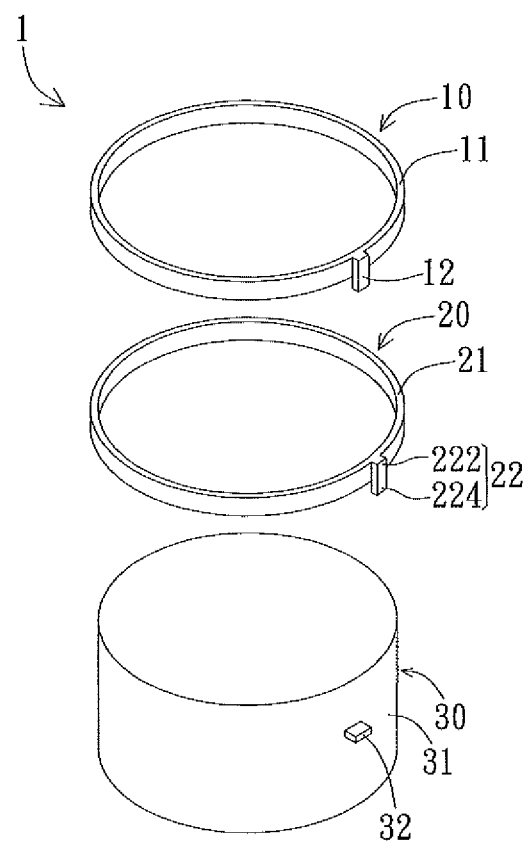
FIG. 1A and FIG. 1B are schematic exploded and assembly diagrams of a rotary device according to an embodiment of the application.
Figure 1B:
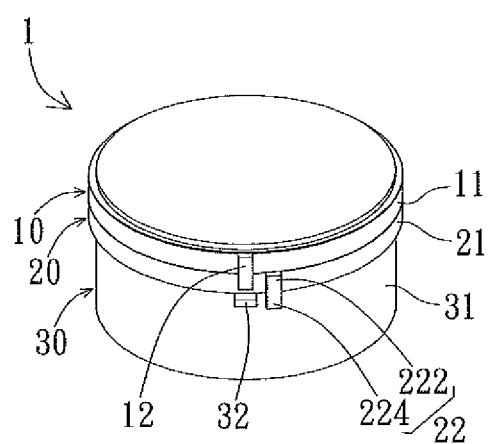

As shown in FIG. 1A and FIG. 1B, in an embodiment, a rotary device 1 of the application includes a rotatable member 10, at least one movable ring 20, and a supporting member 30. In this embodiment, descriptions are provided by using one movable ring 20 as an example, but the application is not limited thereto. The rotatable member 10 includes a rotary ring 11 and a positioning portion 12, and the positioning portion 12 axially protrudes from a periphery of the rotary ring 11. The movable ring 20 includes an acting portion 22. The supporting member 30 includes a stopping portion 32. The rotary ring 11 and the movable ring 20 are coaxially disposed on the supporting member 30, and the movable ring 20 is disposed between the rotatable member 10 and the supporting member 30. The rotary ring 11 and the movable ring 20 is capable of rotating relative to the supporting member 30, and a part of the positioning portion 12 overlaps the movable ring 20. When the rotary ring 11 rotates relative to the supporting member 30, the part of the positioning portion 12 pushes the acting portion 22, to drive the movable ring 20 to rotate until the acting portion 22 is stopped between the positioning portion 12 and the stopping portion 32.

For example, the positioning portion 12 may be a convex column or convex block that radially extends and protrudes from the rotary ring 11 and that axially extends and protrudes over a bottom surface of the rotary ring 11, and a length by which the part of the positioning portion 12 protrudes over the bottom surface of the rotary ring 11 is preferably not greater than a thickness (that is, an axial height) of the movable ring 20 during overlapping with the movable ring 20, to avoid interference with a component below the movable ring 20.

Specifically, the rotatable member 10 may be implemented as any suitable rotation assembly, and may be configured to connect to another device, to provide a function enabling the another device to rotate. The another device is, for example, a display device. After the rotatable member 10 is connected to the another device, the another device is capable of rotating by using an external force applied by a user or by using power provided by another power device.

In an embodiment, the movable ring 20 includes a ring body 21, and the acting portion 22 includes an upper portion 222 and a lower portion 224. The upper portion 222 is protruded from a periphery of the ring body 21, and the lower portion 224 axially protrudes from the ring body 21 from one end of the upper portion 222. For example, the acting portion 22 may be a convex column or convex block that radially extends and protrudes from the ring body 21 and that axially extends and protrudes over a bottom surface of the ring body 21. A part connected to the ring body 21 of the convex column or the convex block may be considered as the upper portion 222 of the acting portion 22. A part that axially protrudes from the ring body 21 of the convex column or convex block may be considered as the lower portion 224 of the acting portion 22. In this embodiment, the movable ring 20 has a same structure as the rotatable member 10, but the application is not limited thereto. An axial thickness of the ring body 21, a width of the acting portion 22 along a periphery direction of the ring body 21, and the like may vary according to actual application.

In this embodiment, the supporting member 30 includes a supporting shaft 31, and the stopping portion 32 is fixed on the supporting shaft 31. For example, the stopping portion 32 may be a convex column or convex block that radially extends and protrudes from the supporting shaft 31. A diameter of the supporting shaft 31 is preferably slightly less than an annular aperture of the ring body 21 and the rotary ring 11, so that the ring body 21 and the rotary ring 11 is capable of rotating relative to the supporting shaft 31 when sleeved over the supporting shaft 31.

As shown in FIG. 1B, when the rotatable member 10 and the movable ring 20 are sleeved over the supporting shaft 31, the positioning portion 12 axially protrudes from the rotary ring 11 and preferably overlaps the ring body 21 of the movable ring 20, thereby effectively reducing an axial height (or thickness) of the rotary device. Further, the positioning portion 12 and the acting portion 22 partially overlap along a periphery direction (or a rotation direction), and the positioning portion 12 does not protrude from a bottom surface of the ring body 21. Specifically, the positioning portion 12 corresponds to the upper portion 222 of the acting portion 22 along the periphery direction (or the rotation direction), so that the part of the positioning portion 12 is capable of pushing the upper portion 222, and the positioning portion 12 preferably does not correspond to the lower portion 224 of the acting portion 22, and in this way, does not interfere with the stopping portion 32 below the movable ring 20. Further, the acting portion 22 partially corresponds to the stopping portion 32. For example, the stopping portion 32 corresponds to the lower portion 224 of the acting portion 22 along the rotation direction, so that the stopping portion 32 is capable of stopping the lower portion 224.

Figure 2A:
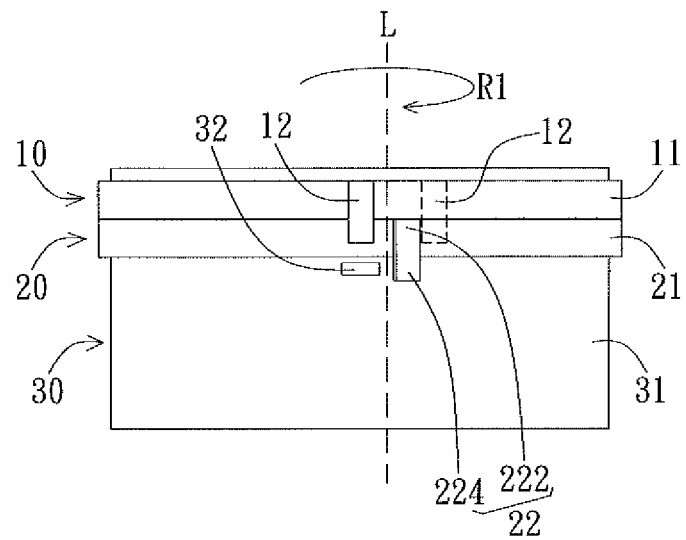
FIG. 2A and FIG. 2B are schematic diagrams of two-way positioning of the rotary device in FIG. 1B.
Figure 2B:
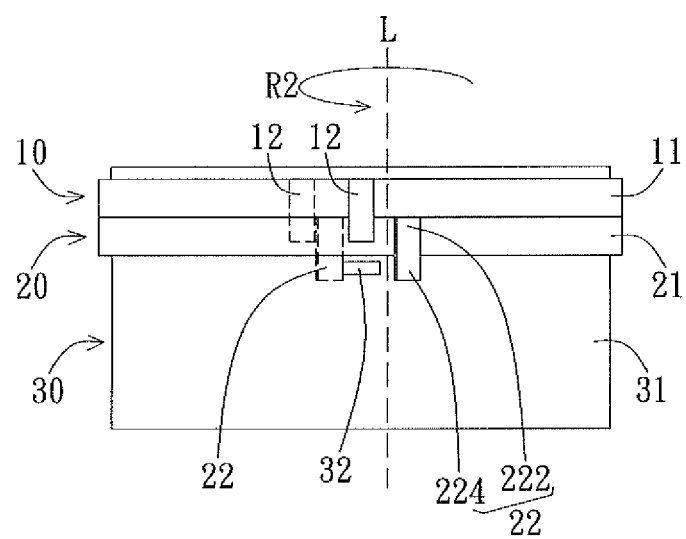

Two-way positioning operation of, for example, approximately ±360 degrees, of the rotary device 1 of the application is described below. As shown in FIG. 2A and FIG. 2B, in an embodiment, the movable ring 20 is preferably disposed to make the acting portion 22 and the stopping portion 32 arranged in a staggered manner from left to right along a virtual line L parallel to an axial direction. For example, the movable ring 20 may be disposed to make the acting portion 22 located in an anticlockwise direction (that is, a right side of the virtual line L) of the stopping portion 32, and the positioning portion 12 of the rotatable member 10 is also preferably arranged on the same side as the stopping portion 32 along the virtual line L, that is, located on a left side of the virtual line L. In this way, when the rotatable member 10 rotates, the part of the positioning portion 12 pushes the acting portion 22, to drive the movable ring 20 to rotate until the acting portion 22 is stopped between the positioning portion 12 and the stopping portion 32 (a dotted line indicates a location of rotation positioning). Specifically, as shown in FIG. 2A, when the rotatable member 10 rotates by approximately 360 degrees along the first rotation direction R1 (for example, a clockwise direction), the part of the positioning portion 12 of the rotatable member 10 abuts against the upper portion 222 of the acting portion 22, and pushes the upper portion 222 of the acting portion 22 to drive the ring body 21 to rotate, until the lower portion 224 of the acting portion 22 touches the stopping portion 32, so that the acting portion 22 is stopped between the positioning portion 12 and the stopping portion 32. To be specific, a right side of the acting portion 22 abuts against the positioning portion 12, and a left side of the acting portion 22 abuts against the stopping portion 32, to achieve approximately 360-degree clockwise positioning of the rotatable member 10. Further, as shown in FIG. 2B, when the rotatable member 10 rotates by approximately 360 degrees along a second rotation direction R2 (for example, an anticlockwise direction) opposite to the first rotation direction R1, the lower portion of the positioning portion 12 of the rotatable member 10 pushes the upper portion 222 of the acting portion 22, and pushes the upper portion 222 of the acting portion 22 to drive the ring body 21 to rotate, until the lower portion 224 of the acting portion 22 touches the stopping portion 32, so that the acting portion 22 is stopped between the positioning portion 12 and the stopping portion 32. To be specific, the left side of the acting portion 22 abuts against the positioning portion 12, and the right side of the acting portion 22 abuts against the stopping portion 32, to achieve approximately 360-degree anticlockwise positioning of the rotatable member 10.

Figure 3A:
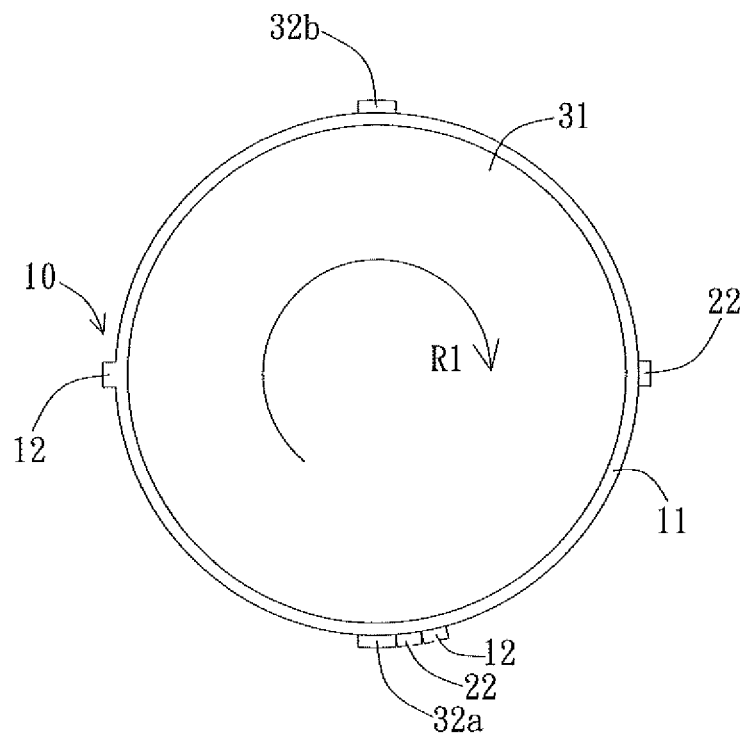
FIG. 3A and FIG. 3B are schematic diagrams of two-way positioning of a rotary device according to another embodiment of the application.
Figure 3B:
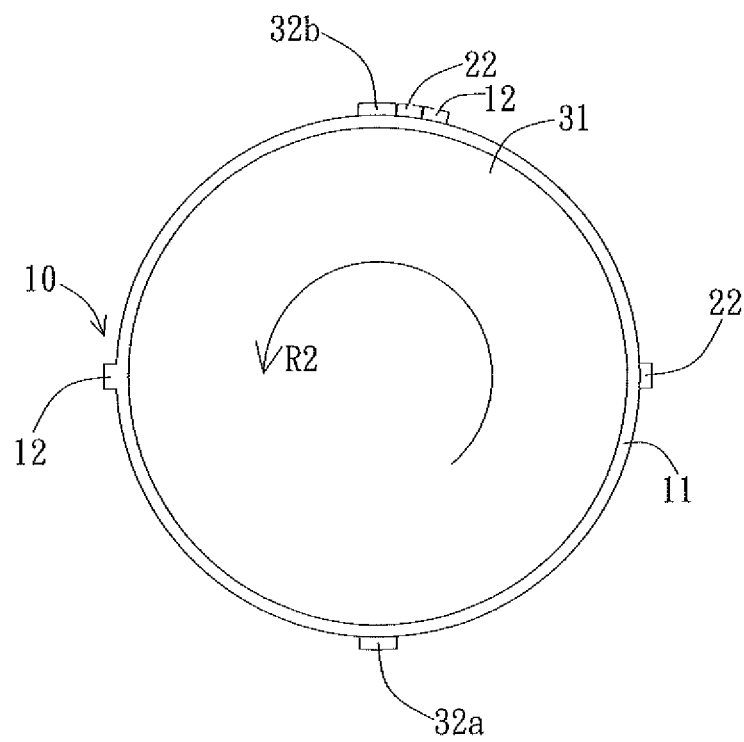

It should be noted herein that although the foregoing embodiment is described by using approximately ±360-degree two-way positioning as an example, but the application is not limited thereto. The rotary device of the application can achieve two-way positioning of different limiting angles by adjusting the number and locations of stopping portions. For example, as shown in FIG. 3A and FIG. 3B, in this embodiment, the supporting member 30 preferably has two stopping portions (for example, a first stopping portion 32a and a second stopping portion 32b). The two stopping portions 32a and 32b are disposed on a periphery of the supporting shaft 31 and are preferably 180-degree away from each other, to achieve two-way positioning of, for example, approximately ±270 degrees. Specifically, the rotatable member 10 is preferably disposed to make the positioning portion 12 located between two stopping portions 32a and 32b. That is, the positioning portion 12 is 90-degree away from the first stopping portion 32a and the second stopping portion 32b respectively, and the movable ring 20 is preferably disposed to make the acting portion 22 located on an opposite side of the positioning portion 12. In other words, the acting portion 22 of the movable ring 20 is also preferably located between the two stopping portions 32a and 32b, and compared with a connection between the two stopping portions 32a and 32b, the acting portion 22 of the movable ring 20 is also preferably located on a side different from the positioning portion 12.

Two-way positioning operation of, for example, approximately ±270 degrees, of the rotary device of this embodiment is described below. Specifically, as shown in FIG. 3A, when the rotatable member 10 rotates along the first rotation direction R1 (for example, the clockwise direction) relative to the supporting member 30, the part of the positioning portion 12 pushes the acting portion 22, to drive the movable ring 20 to rotate until the acting portion 22 is stopped between the positioning portion 12 and the first stopping portion 33a, where the positioning location is indicated by the dotted line. Specifically, when the rotatable member 10 rotates by, for example, approximately 270 degrees along the first rotation direction R1 (for example, the clockwise direction) relative to the supporting shaft 31, the positioning portion 12 of the rotatable member 10 first passes through the second stopping portion 32b, and then the part of the positioning portion 12 abuts against the upper portion of the acting portion 22, and pushes the upper portion of the acting portion 22 to drive the ring body 21 to rotate, until the lower portion of the acting portion 22 touches the first stopping portion 32a, so that the acting portion 22 is stopped between the positioning portion 12 and the first stopping portion 32a, to achieve approximately 270-degree clockwise positioning of the rotatable member 10. Further, as shown in FIG. 3B, when the rotatable member 10 rotates along the second rotation direction R2 (for example, the anticlockwise direction) opposite to the first rotation direction R1 relative to the supporting member 30, the part of the positioning portion 12 pushes the acting portion 22, to drive the movable ring 20 to rotate until the acting portion 22 is stopped between the positioning portion 12 and the second stopping portion 32*b*, where the positioning location is indicated by the dotted line. Specifically, when the rotatable member 10 rotates by, for example, approximately 270 degrees along the second rotation direction R2 (for example, the anticlockwise direction) relative to the supporting shaft 31, the positioning portion 12 of the rotatable member 10 first passes through the first stopping portion 32*a*, and then the part of the positioning portion 12 abuts against the upper portion of the acting portion 22, and pushes the upper portion of the acting portion 22 to drive the ring body 21 to rotate, until the lower portion of the acting portion 22 touches the second stopping portion 32*b*, so that the acting portion 22 is stopped between the positioning portion 12 and the second stopping portion 32*b*, to achieve approximately 270-degree anticlockwise positioning of the rotatable member 10.

Figure 4A:
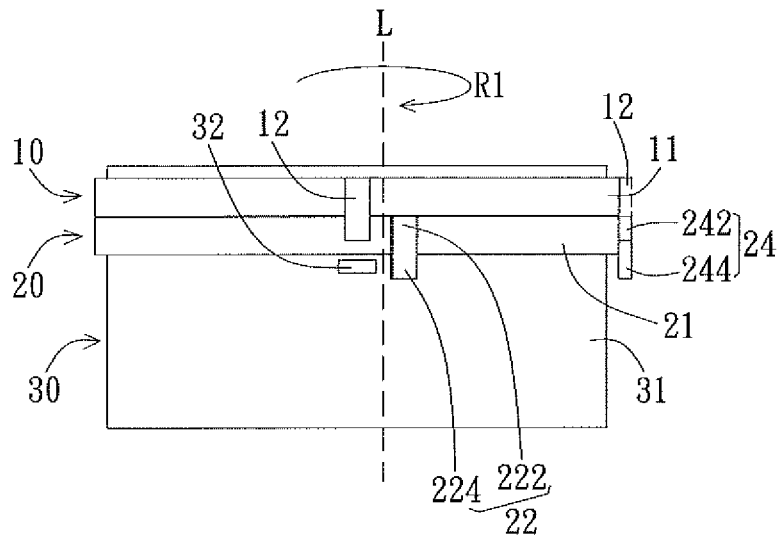
FIG. 4A and FIG. 4B are schematic diagrams of two-way positioning of a rotary device according to another embodiment of the application.
Figure 4B:
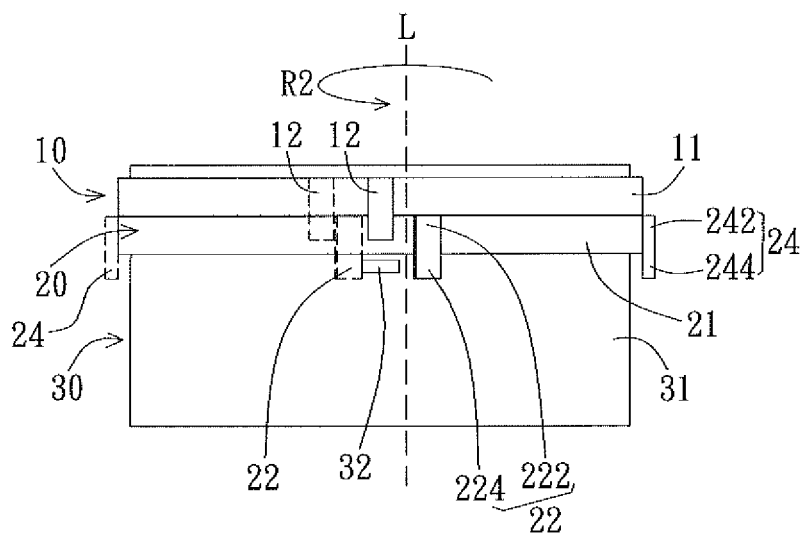

Further, the rotary device of the application can achieve two-way positioning of different limiting angles by adjusting the number and positions of acting portion 22. For example, as shown in FIG. 4A and FIG. 4B, in this embodiment, the movable ring 20 preferably includes two acting portions (for example, a first acting portion 22 and a second acting portion 24), and the two acting portions 22 and 24 are preferably 90-degree away from each other, to achieve two-way positioning of, for example, approximately 270 degrees. Specifically, the rotatable member 10 and the movable ring 20 are preferably set into a configuration similar to FIG. 2A relative to the stopping portion 32. For example, the positioning portion 12, the first acting portion 22, and the stopping portion 32 are arranged in a staggered manner from left to right along the virtual line L parallel to the axial direction, and the second acting portion 24 and the first acting portion 22 are located on the same side of the virtual line L and are 90-degree away from each other. Two-way positioning operation of, for example, approximately ±270 degrees, of the rotary device of this embodiment is described below. Specifically, as shown in FIG. 4A, when the rotatable member 10 rotates along the first rotation direction R1 (for example, the clockwise direction) relative to the supporting member 30, the part of the positioning portion 12 pushes the second acting portion 24, to drive the movable ring 20 to rotate until the second acting portion 24 and the first acting portion 22 are stopped between the positioning portion 12 and the stopping portion 32. Specifically, when the rotatable member 10 rotates by, for example, approximately 270 degrees along the first rotation direction R1 (for example, the clockwise direction) relative to the supporting shaft 31, the part of the positioning portion 12 of the rotatable member 10 first abuts against the upper portion 242 of the second acting portion 24, and pushes the upper portion 242 of the second acting portion 24 to drive the ring body 21 to rotate, until the lower portion 224 of the first acting portion 22 touches the stopping portion 32, so that the second acting portion 24 and the first acting portion 22 are stopped between the positioning portion 12 and the stopping portion 32, to achieve approximately 270-degree clockwise positioning of the rotatable member 10. Further, as shown in FIG. 4B, when the rotatable member 10 rotates along the second rotation direction R2 (for example, the anticlockwise direction) opposite to the first rotation direction R1 relative to the supporting member 30, the part of the positioning portion 12 pushes the first acting portion 22, to drive the movable ring 20 to rotate until the first acting portion 22 and the second acting portion 24 are stopped between the positioning portion 12 and the stopping portion 32. Specifically, when the rotatable member 10 rotates by approximately 270 degrees along the second rotation direction R2 (for example, the anticlockwise direction) opposite to the first rotation direction R1 relative to the supporting shaft 31, the part of the positioning portion 12 of the rotatable member 10 first abuts against the upper portion 222 of the first acting portion 22, and pushes the upper portion 222 of the first acting portion 22 to drive the ring body 21 to rotate, until the lower portion 244 of the second acting portion 24 touches the stopping portion 32, so that the first acting portion 22 and the second acting portion 24 are stopped between the positioning portion 12 and the stopping portion 32, to achieve approximately 270-degree anticlockwise positioning of the rotatable member 10.

Figure 5A:
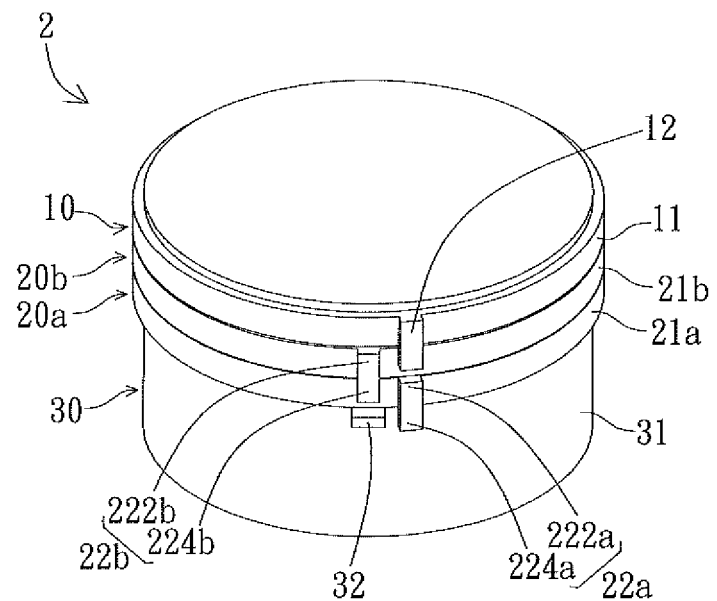
FIG. 5A and FIG. 5B are three-dimensional and side views of a rotary device according to another embodiment of the application.
Figure 5B:
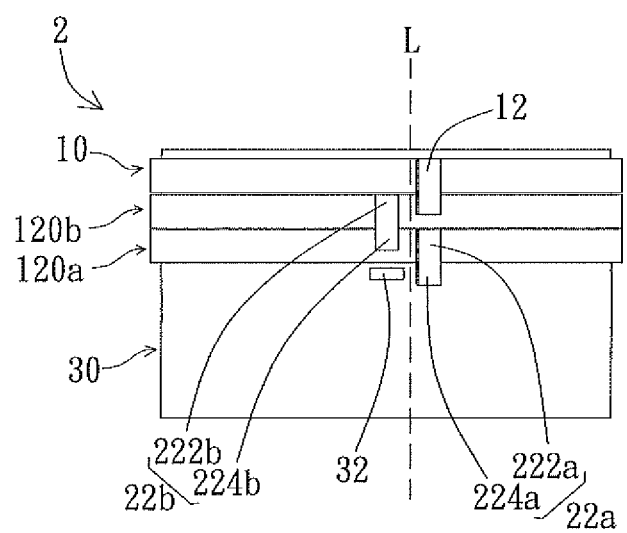

Further, the rotary device of the application may change a two-way positioning angle by increasing the number of movable rings 20, and each additional movable ring results in an additional ±180-degree increase to the two-way limiting angle. As shown in FIG. 5A and FIG. 5B, in another embodiment, a rotary device 2 includes, for example, two movable rings 20*a* and 20*b*. The movable rings 20*a* and 20*b* have a same structure as the movable ring 20 of the embodiment of FIG. 1A. For example, each movable ring includes a ring body 21*a* or 21*b* and an acting portion 22*a* or 22*b*. The acting portion 22*a* or 22*b* includes an upper portion 222*a* or 222*b* and a lower portion 224*a* or 224*b*. The upper portion 222*a* or 222*b* is protruded from a periphery of the ring body 21*a* or 21*b*, and the lower portion 224*a* or 224*b* axially protrudes from the ring body 21*a* or 21*b*, and the like, from one end of the upper portion 222*a* or 222*b*. For related details of the movable rings 20*a* and 20*b*, reference may be made to related descriptions of the movable ring 20 in FIG. 1A, and details are not described herein again. In this embodiment, the two movable rings 20*a* and 20*b* are movably coaxially disposed between the rotatable member 10 and the supporting member 30, and the upper portion 222*b* of the movable ring 20*b* that is close to the positioning portion 12 corresponds to the positioning portion 12, so that the part of the positioning portion 12 is capable of pushing the upper portion 222*b*, and the lower portion 224*a* of the movable ring 20*a* that is close to the stopping portion 32 corresponds to the stopping portion 32, so that the stopping portion 32 is capable of stopping the lower portion 224*a*. Specifically, when a plurality of movable rings (for example, 20*a* and 20*b*) is coaxially disposed, ring bodies thereof (for example, 21*a* and 21*b*) may stack on each other, and the acting portion 22*b* of the upper-layer movable ring (for example, 20*b*) axially protrudes from the ring body 21*b* thereof and overlaps the ring body 21*a* of the lower-layer movable ring 20*a*, and overlaps and corresponds to the acting portion 22*a* of the lower-layer movable ring 20*a* along the rotation direction. In other words, the lower portion 224*b* of the acting portion 22*b* of the upper-layer movable ring 20*b* corresponds to the upper portion 222*a* of the acting portion 22*a* of the lower-layer movable ring 20*a*. Further, similar to the embodiment in FIG. 1A, the upper portion of the acting portion of the movable ring closest to the rotatable member 10 (for example, the top-layer movable ring 20*b*) corresponds to the lower portion of the positioning portion 12, and the lower portion of the acting portion of the movable ring closest to the stopping portion 32 (for example, the bottom-layer movable ring 20*a*) corresponds to the stopping portion 32. In this way, when the rotatable member 10 rotates, the plurality of movable rings 20*a* and 20*b* is capable of driving each other to rotate by using the acting portions 22*a* and 22*b*, until the acting portions are stopped between the positioning portion 12 and the stopping portion 32.

Further, as shown in FIG. 5B, the acting portions of the plurality of movable rings and the stopping portion are preferably arranged in a staggered manner from left to right along the virtual line L parallel to the axial direction. For example, the movable ring 20a may be set to make the acting portion 22a located in an anticlockwise direction of the stopping portion 32 (that is, the right side of the virtual line L), and the movable ring 20b may be set to make the acting portion 22b located in a clockwise direction of the acting portion 22a (that is, the left side of the virtual line L). From another perspective, a location of the stopping portion 32 may be defined as a first side, a location of the acting portion 22a of the movable ring 20a that is close to the stopping portion 32 is defined as a second side, and the positioning portion 12, the acting portions 22a and 22b, and the stopping portion 32 are arranged in a staggered manner respectively along an extension direction of the first side and an extension direction of the second side. Specifically, the stopping portion 32, the acting portions 22a and 22b, and the positioning portion 12 are preferably arranged into two rows alternately from left to right along the axial direction of the supporting shaft 31. To be specific, the acting portion (for example, 22a) of the movable ring (for example, 20a) closest to the stopping portion 32 and the stopping portion 32 are respectively located at the bottom of the two rows, and acting portions of axially adjacent movable rings are respectively located in different rows. That is, a plurality of movable rings other than the movable ring (for example, 20a) closest to the stopping portion 32 are respectively aligned, across rings along the axial direction, with the stopping portion 32 and the acting portion (for example, 22a) of the movable ring (for example, 20a) closest to the stopping portion 32.

It should be noted herein that to achieve two-way positioning of a same angle, setting of the positioning portion 12 of the rotatable 10 preferably varies according to different numbers of movable rings. Specifically, when the number of movable rings is an odd number (as shown in the embodiment of FIG. 1A), the positioning portion 12 of the rotatable member 10 is preferably arranged on the same side as the stopping portion 32 along the virtual line L; when the number of the movable rings is an even number, the positioning portion 12 of the rotatable member 10 is preferably set to be 180-degree away from the stopping portion 32. For example, the positioning portion 12 of the rotatable member 10 and the stopping portion 32 are located on two opposite sides relative to the supporting shaft 31. For example, in this embodiment, the number of the movable rings 20a and 20b is two. Therefore, the positioning portion 12 of the rotatable member 10 and the stopping portion 32 are preferably set to be 180-degree away from each other, to achieve two-way positioning of, for example, ±540 degrees.

Figure 6A:
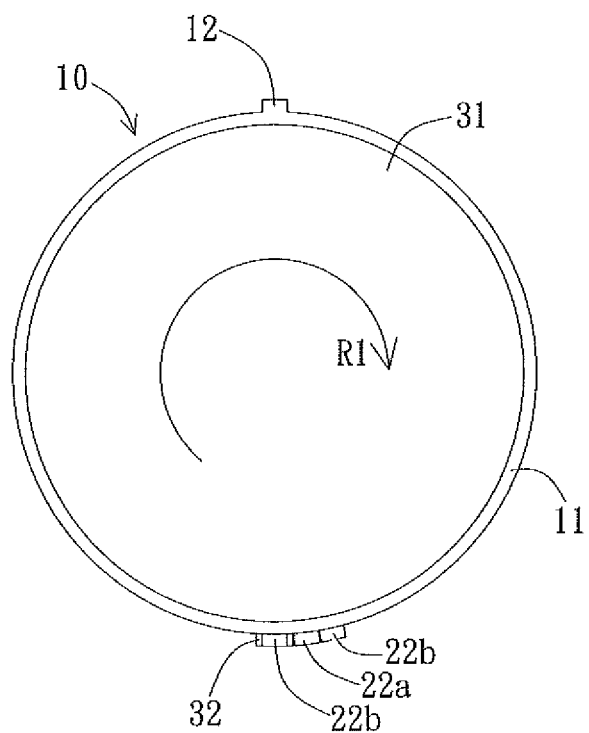
FIG. 6A and FIG. 6B are schematic diagrams of two-way positioning of the rotary device in FIG. 5A.

When the rotatable member 10 rotates relative to the supporting member 30, the part of the positioning portion 12 pushes the upper portion 222b of the acting portion 22b of the movable ring 20b that is close to the positioning portion 12, and drives the lower portion 224b of the movable ring 20a close to the positioning portion 12 to push the upper portion 222a of the adjacent movable ring 20a. The acting portions 22a and 22b sequentially drive the adjacent movable rings 20b and 20a to rotate until the stopping portion 32 stops the lower portion 224a of the movable ring 20a that is close to the stopping portion 32, and the acting portions 22a and 22b are stopped between the positioning portion 12 and the stopping portion 32. Specifically, referring to FIG. 5B and FIG. 6A, when the rotatable member 10 rotates by, for example, approximately 540 degrees along the first rotation direction R1 (for example, the clockwise direction), the part of the positioning portion 12 of the rotatable member 10 first abuts against the upper portion 222b of the acting portion 22b of the movable ring 20b when rotating by approximately 180 degrees, and pushes the upper portion 222b of the acting portion 22b to drive the ring body 21b to rotate. Next, when the rotatable member 10 drives the movable ring 20b to continue to rotate by, for example, approximately 360 degrees along the first rotation direction R1 (that is, the clockwise direction), the lower portion 224b of the acting portion 22b abuts against the upper portion 222a of the acting portion 22a of the movable ring 20a, and pushes the upper portion 222a of the acting portion 22a to drive the ring body 21a to rotate, until the lower portion 224a of the acting portion 22a touches the stopping portion 32, so that the acting portions 22a and 22b are stopped between the positioning portion 12 and the stopping portion 32, thereby achieving approximately 540-degree clockwise positioning of the rotatable member 10.

Figure 6B:
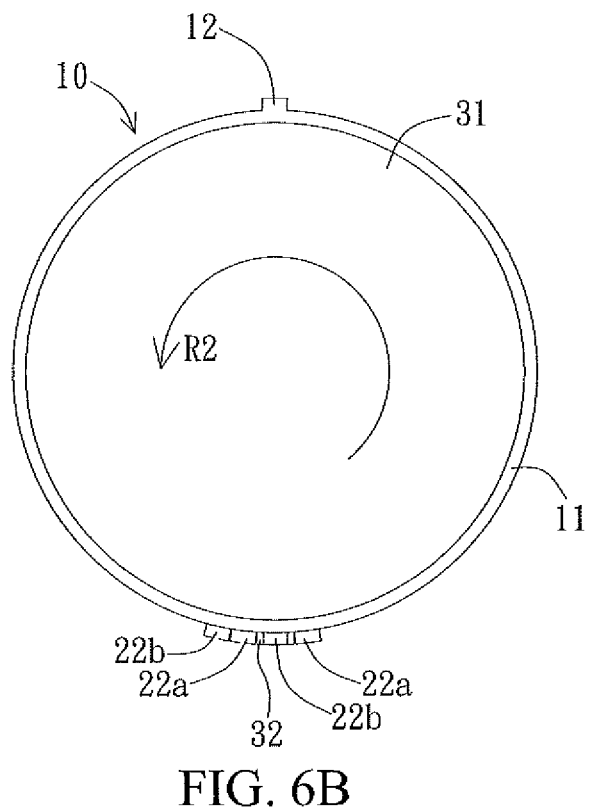

Further, referring to FIG. 5B and FIG. 6B, when the rotatable member 10 rotates by, for example, approximately 540 degrees along the second rotation direction R2 (for example, the anticlockwise direction) opposite to the first rotation direction R1, the part of the positioning portion 12 of the rotatable member 10 first abuts against the upper portion 222b of the acting portion 22b of the movable ring 20b when rotating by approximately 180 degrees, and pushes the upper portion 222b of the acting portion 22b to drive the ring body 21b to rotate. Next, when the rotatable member 10 drives the movable ring 20b to continue to rotate by, for example, approximately 360 degrees along the second rotation direction R2 (that is, the anticlockwise direction), the lower portion 224b of the acting portion 22b abuts against the upper portion 222a of the acting portion 22a of the movable ring 20a, and pushes the upper portion 222a of the acting portion 22a to drive the ring body 21a to rotate, until the lower portion 224a of the acting portion 22a touches the stopping portion 32, so that the acting portions 22a and 22b are stopped between the positioning portion 12 and the stopping portion 32, thereby achieving approximately 540-degree anticlockwise positioning of the rotatable member 10.

Further, in the embodiment of FIG. 3A and FIG. 3B and FIG. 4A and FIG. 4B, a two-way positioning angle may also be increased by increasing the number of movable rings, for example, two-way positioning of approximately ±450 (=270+180) degrees. In other words, in the embodiment of FIG. 5A and FIG. 5B, the number and positions of the stopping portions or acting portions may also be changed according to actual application, to achieve two-way positioning of less than ±540 degrees. Details are not described herein again.

Figure 7A:
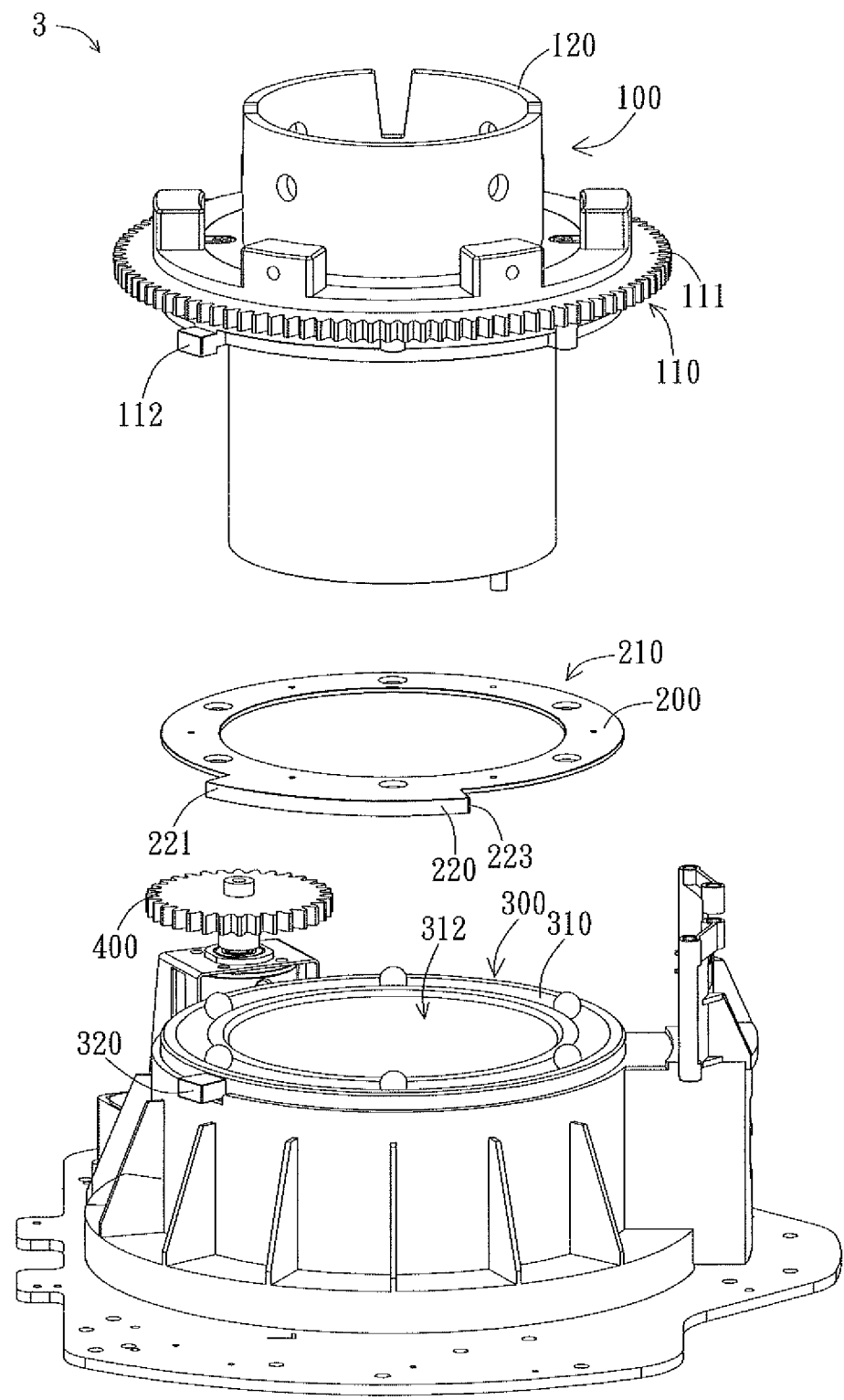
FIG. 7A to FIG. 7C are respectively partial exploded, side, and assembly schematic diagrams of a rotary device according to another embodiment of the application.
Figure 7B:
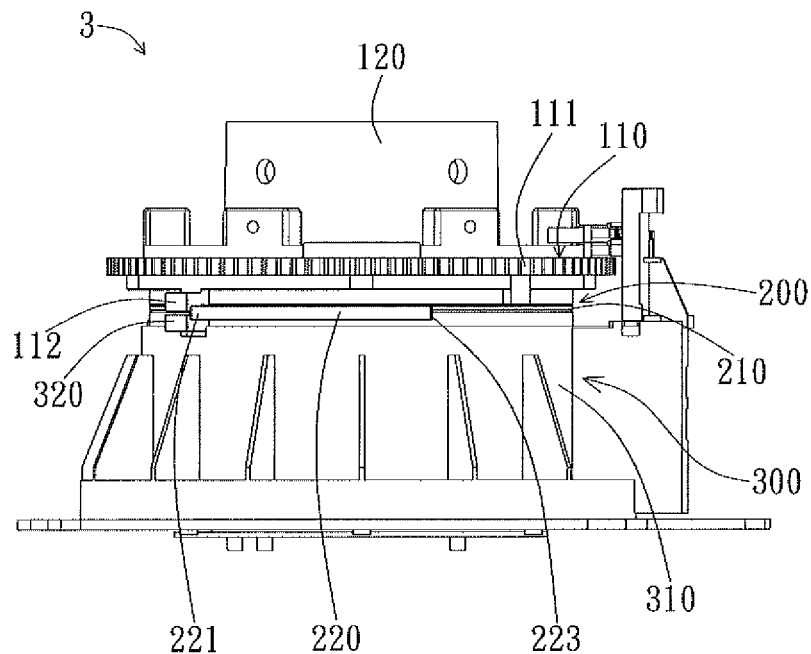
Figure 7C:
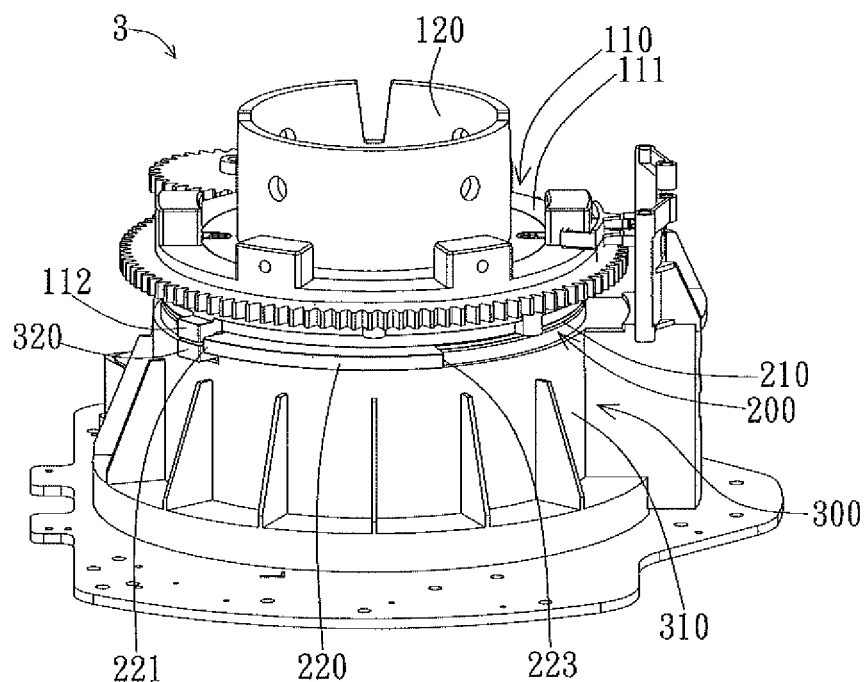

In addition, the rotary device of the application may be applied to a rotatable member that rotates by using power. In another embodiment, as shown in FIG. 7A to FIG. 7C, a rotary device 3 includes a rotatable member 100, a movable ring 200, and a supporting member 300. In this embodiment, the rotary device 3 preferably may further include a driving gear 400, configured to receive a power to rotate, thereby driving the rotatable member 100 to rotate. Specifically, the rotatable member 100 preferably includes a rotary ring 110 and a shaft body portion 120, and a positioning portion 112 axially protrudes from a periphery of the rotary ring 110 and partially overlaps the movable ring 200. The rotary ring 110 is fixedly sleeved over the shaft body portion 120, and enables the rotatable member 100 to be rotatably disposed on the supporting member 300. In this embodiment, the supporting member 300 preferably includes a base 310, and a stopping portion 320 is fixed on the base 310.

For example, the rotary ring 110 may include a gear portion 111, and the gear portion 111 is engaged with the driving gear 400, so that the driving gear 400 receives power provided by, for example, a motor, to rotate, and drives the gear portion 111 to rotate, thereby driving the rotatable member 100 to rotate. However, the application is not limited thereto. In other embodiments, according to actual application, the rotatable member 100 may receive driving of a driving device (for example, a motor) to rotate, and does not need to be driven by the driving gear 400, or the rotatable member 100 may rotate by using an external force applied by a user, and a driving device does not need to be disposed.

As shown in FIG. 7A, in an embodiment, the driving gear 400 is preferably disposed on the base 310 corresponding to the rotatable member 100. However, the application is not limited thereto. In other embodiments, according to actual application, the driving gear 400 may be disposed independent of the base 310. In this embodiment, the base 310 preferably has an accommodating slot 312, and the rotatable member 100 is partially inserted into the accommodating slot 312 and is capable of rotating in the accommodating slot 312 relative to the base 310. For example, the gear portion 111 is disposed coaxial with the shaft body portion 120, so that the shaft body portion 120 is rotatably inserted into the accommodating slot 312, and the gear portion 111 may rotate together with the shaft body portion 120 relative to the base 310. However, the application is not limited thereto. In other embodiments (not drawn), the shaft body portion 120 may be integrated on the base 310, and the rotatable member 100 is preferably an annular gear portion 111, so that the gear portion 111 is rotatably sleeved over the shaft body portion of the base 310, and the gear portion 111 is capable of rotating relative to the shaft body portion of the base 310.

Further, similar to the foregoing embodiment, the movable ring 200 and the rotatable member 100 are coaxially disposed between the rotatable member 100 and the supporting member 300, and the rotatable member 100 drives the movable ring 200 to rotate, and the stopping portion 320 stops the movable ring 200, to position the rotatable member 100. Specifically, the movable ring 200 includes a ring body 210 and an acting portion 220, and the acting portion 220 has two opposite ends 221 and 223 along the periphery of the ring body 210. For example, the ring body 210 is preferably in a shape of a flat ring. The ring body 210 is rotatably sleeved over the shaft body portion 120, and is located between the rotary ring 110 and the base 310, and the acting portion 220 axially extends to make the upper portion of the acting portion 220 correspond to the positioning portion 112, and make the lower portion of the acting portion 220 correspond to the stopping portion 320. In an embodiment, the acting portion 220 of the movable ring 200 may be an arc-shaped convex block that radially protrudes and extends downward and that is concentric with the ring body 210, and an arc of the acting portion 220 extending along the ring body 210 has a corresponding preset central angle. In other words, the acting portion 220 has the first end 221 and the second end 223, and an angle between the first end 221 and the second end 223 and a circle center is a central angle. By using approximately ±270-degree two-way positioning as an example, a central angle corresponding to the acting portion 220 is preferably 90 degrees, but the application is not limited thereto. The central angle corresponding to the acting portion 220 may vary according to a positioning angle.

In this embodiment, the stopping portion 320 is preferably a baffle block disposed on the base 310, to correspond to the acting portion 220 of the movable ring 200, and the positioning portion 112 may be a block protruding from below of the gear portion 111. In an embodiment, positions of the positioning portion 112, the acting portion 220, and the stopping portion 320 are preferably located on a circumference of a same circle, and horizontal projections of the positioning portion 112 and the stopping portion 320 in the axial direction do not overlap (that is, heights are different), and a horizontal projection of the acting portion 220 in the axial direction preferably partially overlaps with those of the positioning portion 112 and the stopping portion 320 separately. To be specific, the axial location of the acting portion 220 is preferably between the positioning portion 112 and the stopping portion 320. A part of the acting portion 220 corresponds to the positioning portion 112, and the other part of the acting portion 220 corresponds to the stopping portion 320.

Similar to the embodiment of FIG. 4A, when the rotatable member 100 rotates by (for example, approximately 270 degrees) in a clockwise direction, the part of the positioning portion 112 of the rotatable member 100 pushes the second end 223 of the acting portion 220 of the movable ring 200, to drive the movable ring 200 to move until the first end 221 of the acting portion 220 touches the stopping portion 320, so that the acting portion 220 is stopped between the positioning portion 112 and the stopping portion 320, thereby achieving approximately 270-degree clockwise positioning of the rotatable member 100. Further, similar to the embodiment of FIG. 4B, when the rotatable member 100 rotates by (for example, approximately 270 degrees) in an anticlockwise direction, the part of the positioning portion 112 of the rotatable member 100 pushes the first end 221 of the acting portion 220 of the movable ring 200, to drive the movable ring 200 to move until the second end 223 of the acting portion 220 touches the stopping portion 320, so that the acting portion 220 is stopped between the positioning portion 112 and the stopping portion 320, thereby achieving approximately 270-degree anticlockwise positioning of the rotatable member 100.

Based on the above, the rotary device of the application can provide a function of two-way positioning of greater than 180 degrees. Further, the rotary device of the application can increase both a two-way limiting angle and the number of two-way rotations by increasing the number of movable rings.

The application is described through the foregoing embodiments. However, the foregoing embodiments are intended for an exemplary objective only, rather than a limitative objective. A person skilled in the art should know that other modifications of exemplified embodiments may be made to embodiments specifically described herein without departing from the spirit of the application. Therefore, the scope of the application also covers such modifications and is limited only to the appended claims.

What is claimed is:
1. A rotary device, comprising:
   a supporting member, comprising a stopping portion, wherein the stopping portion radially protrudes from a periphery of the supporting member;
   a rotatable member, comprising a rotary ring and a positioning portion, wherein the positioning portion axially protrudes from a periphery of the rotary ring and axially extends and protrudes over a bottom surface of the rotary ring; and at least one movable ring, disposed coaxial with the rotary ring on the supporting member, wherein the at least one movable ring is disposed between the rotatable member and the supporting member, the rotary ring and the at least one movable ring is capable of rotating relative to the supporting member, a part of the positioning portion overlaps the movable ring, each of the at least one movable ring comprises a ring body and an acting portion, the acting portion protrudes from the ring body, extends and protrudes over a bottom surface of the ring body, and partially overlapped an outermost periphery of the supporting member, when the rotary ring rotates relative to the supporting member, the rotatable member is capable of pushing the acting portion by using the part of the positioning portion, to drive the at least one movable ring to rotate, until the acting portion is stopped between the positioning portion and the stopping portion.

2. The rotary device according to claim 1, wherein the acting portion comprises an upper portion and a lower portion, the upper portion is protruded from the periphery of the ring body, the lower portion axially protrudes from the ring body from one end of the upper portion, the part of the positioning portion corresponds to the upper portion, so that the part of the positioning portion is capable of pushing the upper portion, and the stopping portion corresponds to the lower portion, so that the stopping portion is capable of stopping the lower portion.

3. The rotary device according to claim 1, wherein the supporting member comprises a supporting shaft, the stopping portion is fixed on the supporting shaft, and the positioning portion axially protrudes from the rotary ring and overlaps the movable ring.

4. The rotary device according to claim 1, wherein the supporting member comprises a base, the stopping portion is fixed on the base, the rotatable member further comprises a shaft body portion, the positioning portion axially protrudes from a periphery of the rotary ring, and the rotary ring is fixedly sleeved over the shaft body portion, so that the rotatable member is rotatably disposed on the base.

5. The rotary device according to claim 1, wherein the at least one movable ring is a plurality of the movable rings, the acting portion comprises an upper portion and a lower portion, the upper portion is protruded from a periphery of the ring body, the lower portion axially protrudes from the ring body from one end of the upper portion, the movable rings are movably coaxially disposed between the rotatable member and the supporting member, and the upper portion of the movable ring that is close to the positioning portion corresponds to the positioning portion, so that the part of the positioning portion is capable of pushing the upper portion, and the lower portion of the movable ring that is close to the stopping portion corresponds to the stopping portion, so that the stopping portion is capable of stopping the lower portion.

6. The rotary device according to claim 5, wherein when the rotary ring rotates relative to the supporting member, the part of the positioning portion pushes the upper portion of the movable ring that is close to the positioning portion, and drives the lower portion of the movable ring that is close to the positioning portion to push the adjacent upper portion of the movable ring, the acting portions sequentially drive the adjacent movable rings to rotate until the stopping portion stops the lower portion of the movable ring that is close to the stopping portion, and the acting portions are stopped between the positioning portion and the stopping portion.

7. The rotary device according to claim 5, wherein the positioning portion, the acting portions, and the stopping portion are arranged in a staggered manner from left to right along a virtual line parallel to an axial direction.

8. The rotary device according to claim 7, wherein when the number of the movable rings is an odd number, the positioning portion of the rotatable member is arranged along the virtual line on the same side as the stopping portion, and when the number of the movable rings is an even number, the positioning portion of the rotatable member is disposed 180-degree away from the stopping portion.

9. The rotary device according to claim 5, wherein a location of the stopping portion is defined as a first side, a location of the acting portion of the movable ring that is close to the stopping portion is defined as a second side, and the positioning portion, the acting portions, and the stopping portion are arranged in a staggered manner respectively along an extension direction of the first side and an extension direction of the second side.

10. The rotary device according to claim 9, wherein when the number of the movable rings is an odd number, the positioning portion of the rotatable member is located on the same side as the stopping portion, and when the number of the movable rings is an even number, the positioning portion of the rotatable member is disposed 180-degree away from the stopping portion.

11. The rotary device according to claim 1, wherein the acting portion comprises a first acting portion, the movable ring further comprises a second acting portion, and the second acting portion and the first acting portion are disposed on a periphery of the ring body; when the rotary ring rotates along a first rotation direction relative to the supporting member, the part of the positioning portion pushes the second acting portion, to drive the at least one movable ring to rotate until the second acting portion and the first acting portion are stopped between the positioning portion and the stopping portion; and when the rotary ring rotates along a second rotation direction opposite to the first rotation direction relative to the supporting member, the part of the positioning portion pushes the first acting portion, to drive the at least one movable ring to rotate until the first acting portion and the second acting portion are stopped between the positioning portion and the stopping portion.

12. The rotary device according to claim 1, wherein the stopping portion comprises a first stopping portion, the supporting member further comprises a second stopping portion, and the second stopping portion and the first stopping portion are disposed on a periphery of the supporting member; when the rotary ring rotates along a first rotation direction relative to the supporting member, the part of the positioning portion pushes the acting portion, to drive the at least one movable ring to rotate until the acting portion is stopped between the positioning portion and the first stopping portion; and when the rotary ring rotates along a second rotation direction opposite to the first rotation direction relative to the supporting member, the part of the positioning portion pushes the acting portion, to drive the at least one movable ring to rotate until the acting portion is stopped between the positioning portion and the second stopping portion.

* * * * *